(12) United States Patent
Kumada (10) Patent No.: US 9,089,033 B2
(45) Date of Patent: Jul. 21, 2015

(54) LED LIGHTING DEVICE

(71) Applicant: Panasonic Corporation, Osaka (JP)

(72) Inventor: Kazuhiro Kumada, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 225 days.

(21) Appl. No.: 13/952,914

(22) Filed: Jul. 29, 2013

(65) Prior Publication Data

US 2014/0035462 A1  Feb. 6, 2014

(30) Foreign Application Priority Data

Aug. 3, 2012  (JP) ................................. 2012-173431

(51) Int. Cl.
*H05B 37/00* (2006.01)
*H05B 33/08* (2006.01)
*H02H 9/00* (2006.01)

(52) U.S. Cl.
CPC .......... *H05B 33/0887* (2013.01); *H05B 33/089* (2013.01); *H05B 33/0815* (2013.01); *H02H 9/002* (2013.01)

(58) Field of Classification Search
CPC ......... H05B 37/00; H05B 39/04; H05B 41/28
USPC ....................................................... 315/127
See application file for complete search history.

(56) References Cited

U.S. PATENT DOCUMENTS

| 8,664,883 | B2 * | 3/2014 | Hiramatu et al. ............. 315/291 |
| 8,946,995 | B2 * | 2/2015 | Pflaum ......................... 315/127 |
| 2012/0153832 | A1 | 6/2012 | Hamamoto et al. | |

FOREIGN PATENT DOCUMENTS

| EP | 2 213 932 A1 | 8/2010 |
| EP | 2 466 993 A2 | 6/2012 |
| JP | 2008-104273 A | 5/2008 |
| JP | 2010-177131 A | 8/2010 |
| JP | 2011-222267 A | 11/2011 |
| JP | 2012-014879 A | 1/2012 |
| JP | 2012-064430 A | 3/2012 |
| JP | 2012-135095 A | 7/2012 |

* cited by examiner

*Primary Examiner* — Hai L Nguyen
(74) *Attorney, Agent, or Firm* — Renner, Otto, Boisselle & Sklar, LLP (57) ABSTRACT

An LED lighting device includes a step-up chopper circuit for increasing an input voltage to a prescribed DC voltage, a voltage detection circuit for detecting the DC voltage, a step-down chopper circuit for decreasing the DC voltage to apply it across a light source, a step-down chopper controlling circuit for turning on and off a switching device of the step-down chopper circuit when the DC voltage is a threshold voltage or more, and an inrush current preventing circuit having a parallel circuit of a thyristor and a thermistor. When the DC voltage is less than the threshold voltage, only the induced voltage obtained from the step-up chopper circuit is employed as a drive power supply for the thyristor. When the DC voltage is the threshold voltage or more, only the induced voltage obtained from the step-down chopper circuit is employed as the drive power supply.

2 Claims, 4 Drawing Sheets

LED LIGHTING DEVICE

TECHNICAL FIELD

The invention relates to an LED lighting device.

BACKGROUND ART

For example, Japanese Patent Application Publication Number 2012-135095 A discloses an LED lighting device. In this LED lighting device, when a second switching device of a voltage step-down portion is short-circuited, a voltage applied across a light source portion exceeds a prescribed voltage. In this case, a first switching device of a voltage step-up portion is inactivated. As a result, a switch element is turned off and an electric current from a DC power supply portion flows through a current-limiting element, thereby limiting a load current flowing through the light source portion to prevent an excess current from flowing therethrough.

However, in the LED lighting device, there is a problem that the power consumption in the current-limiting element increases. In a period of time (see "Ta" in FIG. 2) when the booster portion is activated and the voltage down portion is inactivated, the switch element is in off-state and an electric current flows through the current-limiting element (a thermistor). In this case, a resistance value of the current-limiting element largely increases and a voltage across the current-limiting element increases as well. As a result, the power consumption in the current-limiting element increases. In addition, there is a concern that the booster portion cannot perform a normal step-up operation, because the voltage across the current-limiting element increases and thereby an input voltage to the booster portion may decrease to fall below a rated input value thereof.

SUMMARY OF INVENTION

The present invention has been achieved in view of the above circumstances, and an object thereof is to provide an LED lighting device which allows a step-up chopper circuit to surely perform a step-up operation and prevents excess power from being supplied to a light source when a switching device of a step-down chopper circuit is short-circuited.

An LED lighting device includes: a step-up chopper circuit (3), a step-up chopper controlling circuit (31), a voltage detection circuit (5), a step-down chopper circuit (4), a step-down chopper controlling circuit (41), and an inrush current preventing circuit (6). The step-up chopper circuit (3) includes a first switching device (Q31) and a first primary winding (N11) and is configured to step up an input voltage to a prescribed DC voltage in response to a turning on and off of the first switching device (Q31). The step-up chopper controlling circuit (31) is configured to control the turning on and off of the first switching device (Q31). The voltage detection circuit (5) is configured to detect an output voltage of the step-up chopper circuit (3). The step-down chopper circuit (4) includes a second switching device (Q41) and a second primary winding (N21) and is configured, in response to a turning on and off of the second switching device (Q41), to step down the output voltage of the step-up chopper circuit (3) to apply the stepped down voltage across a light source formed of one or more light emitting devices. The step-down chopper controlling circuit (41) is configured: to keep an OFF state of the second switching device (Q41) when a detection result of the voltage detection circuit (5) is less than a threshold; and to control the turning on and off of the second switching device (Q41) when the detection result of the voltage detection circuit (5) is equal to or larger than the threshold. The inrush current preventing circuit (6) includes a third switching device (Q61) and a current-limiting element (PTH61) connected in parallel with the third switching device (Q61) and is provided on an input current path of the step-up chopper circuit (3). The third switching device (Q61) employs, as a drive power supply thereof, voltages induced across a first secondary winding (N12) magnetically coupled to the first primary winding (N11) and a second secondary winding (N22) magnetically coupled to the second primary winding (N21). The inrush current preventing circuit (6) further includes a drive power switch (Q62) configured: to employ only the voltage induced across the first secondary winding (N12) as the drive power supply of the third switching device (Q61) when the detection result of the voltage detection circuit (5) is less than the threshold; and also to employ only the voltage induced across the second secondary winding (N22) as the drive power supply of the third switching device (Q61) when at least the detection result of the voltage detection circuit (5) is equal to or larger than the threshold.

In an embodiment, the drive power switch (Q62) is configured: to employ the voltages induced across the first secondary winding (N12) and across the second secondary winding (N22) as drive power supply of the third switching device (Q61) for a prescribed period of time from a point in time when the detection result of the voltage detection circuit (5) is equal to or larger than the threshold; and to employ only the voltage induced across the second secondary winding (N22) as drive power supply of the third switching device (Q61) after the prescribed period of time elapses.

In the configuration, when only the step-up chopper circuit (3) is activated, only the voltage induced across the first primary winding (N11) is employed as the drive power supply of the third switching device (Q61). It is therefore possible to suppress a reduction of the input voltage to the step-up chopper circuit (3), caused by the current-limiting element (PTH61), thereby allowing the step-up chopper circuit (3) to surely perform a step-up operation thereof. In addition, after the step-down chopper circuit (4) starts performing a step-down operation thereof, only the voltage induced across the second primary winding (N21) is employed as the drive power supply of the third switching device (Q61). It is therefore possible to prevent excess power from being supplied to the light source (7) when the second switching device (Q41) of the step-down chopper circuit (4) is short-circuited.

BRIEF DESCRIPTION OF DRAWINGS

Preferred embodiments of the invention will now be described in further details. Other features and advantages of the present invention will become better understood with regard to the following detailed description and accompanying drawings where.

DESCRIPTION OF EMBODIMENTS

Embodiment 1

An LED lighting device in the embodiment includes: a step-up chopper circuit (3), a step-up chopper controlling circuit (31), a voltage detection circuit (5), a step-down chopper circuit (4), a step-down chopper controlling circuit (41), and an inrush current preventing circuit (6). The step-up chopper circuit (3) includes a first switching device (Q31) and a first primary winding (N11) and is adapted to step up an input voltage to a prescribed DC voltage in response to the turning on and off of the first switching device (Q31). The step-up chopper controlling circuit (31) is adapted to control the turning on and off of the first switching device (Q31). The voltage detection circuit (5) is adapted to detect an output voltage of the step-up chopper circuit (3). The step-down chopper circuit (4) includes a second switching device (Q41) and a second primary winding (N21) and is adapted, in response to the turning on and off of the second switching device (Q41), to step down (decrease) the output voltage of the step-up chopper circuit (3) to apply the stepped down voltage across a light source (7) formed of one or more light emitting devices. The step-down chopper controlling circuit (41) is adapted: to keep the second switching device (Q41) turned off if a detection result of the voltage detection circuit (5) is less than a threshold; and to control the turning on and off of the second switching device (Q41) if the detection result of the voltage detection circuit (5) is equal to or larger than (reaches) the threshold. The inrush current preventing circuit (6) includes a third switching device (Q61) and a current-limiting element (PTH61) connected in parallel with the third switching device (Q61) and is provided on an input current path of the step-up chopper circuit (3). The third switching device (Q61) employs, as a drive power supply thereof, voltages induced across a first secondary winding (N12) magnetically coupled to the first primary winding (N11) and a second secondary winding (N22) magnetically coupled to the second primary winding (N21). The inrush current preventing circuit (6) further includes a drive power switch (Q62) adapted: to employ only the voltage induced across the first secondary winding (N12) as the drive power supply of the third switching device (Q61) if a detection result of the voltage detection circuit (5) is less than the threshold; and also to employ only the voltage induced across the second secondary winding (N22) as the drive power supply of the third switching device (Q61) if at least the detection result of the voltage detection circuit (5) is equal to or larger than the threshold.

Figure 1:
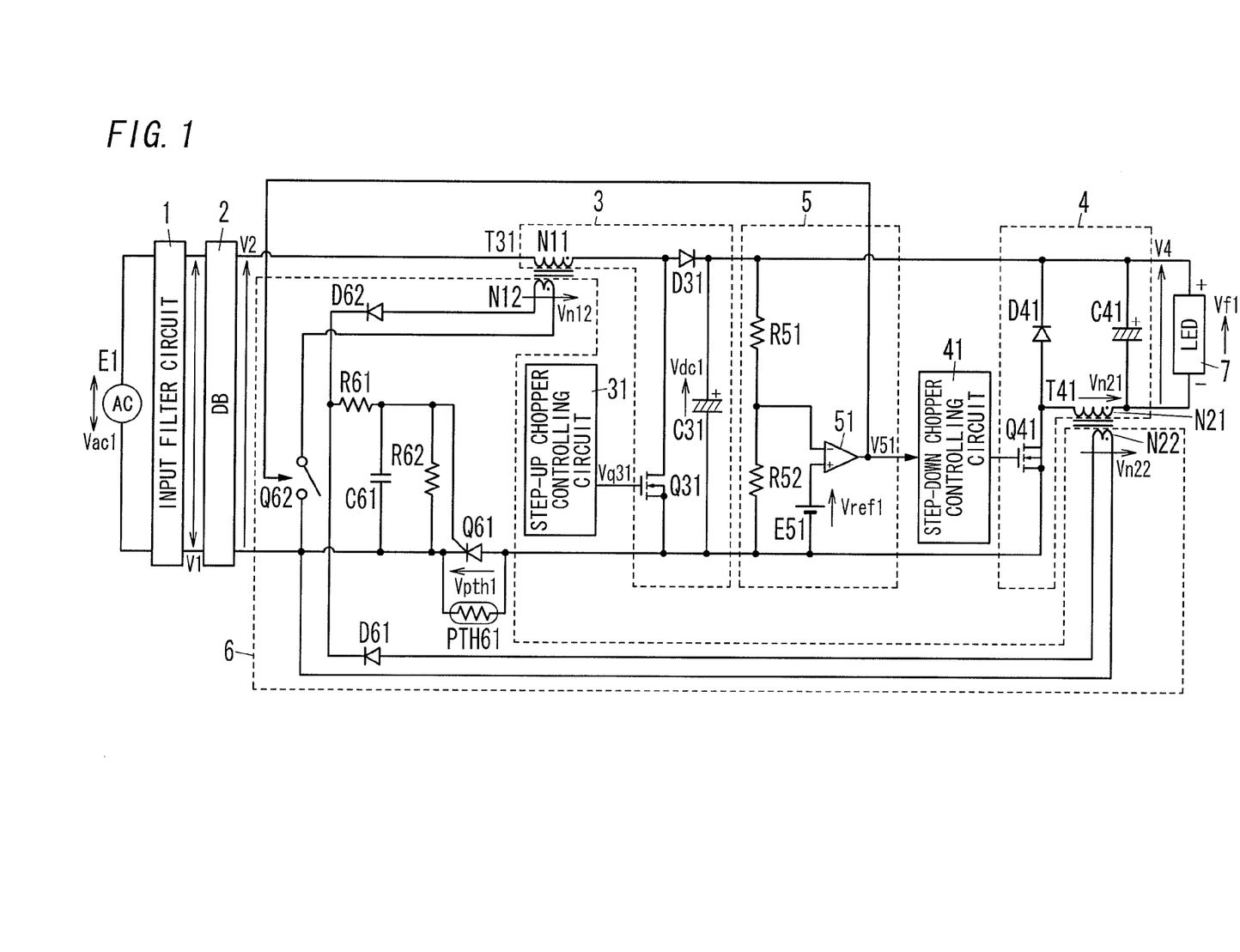
FIG. 1 is a circuit diagram of an LED lighting device, in accordance with a first embodiment of the present invention.

Specifically, as shown in FIG. 1, the LED lighting device in the embodiment is mainly composed of an input filter circuit 1, a rectifier circuit (DB) 2, a step-up chopper circuit 3, a step-down chopper circuit 4, a voltage detection circuit 5 and an inrush current preventing circuit 6. The LED lighting device is configured to receive input power from an AC power supply E1 to power a light source 7 formed of light-emitting diodes (light emitting devices). A configuration of the LED lighting device shown in the example of FIG. 1 is explained below.

The input filter circuit 1 is connected to output ends of the AC power supply E1 and configured to perform a noise reduction of an AC voltage Vac1 inputted from the AC power supply E1 and the like to supply an AC voltage V1 to the latter rectifier circuit 2.

The rectifier circuit 2 includes a diode bridge (DB) formed of diodes (not shown) and is adapted to full-wave rectify the AC voltage V1 inputted from the input filter circuit 1 to supply a DC voltage (a full-wave rectified voltage) V2 to the latter step-up chopper circuit 3. As an example, a DC power supply may be applied to the LED lighting device in place of the AC power supply E1. In this example, the input filter circuit 1 and the rectifier circuit 2 are omitted.

The step-up chopper circuit 3 is formed of a primary winding N11 (a first primary winding) of a transformer T31, a switching device Q31 (a first switching device), a diode D31, and a capacitor C31. A series circuit of the primary winding N11 functioning as a choke coil and the switching device Q31 is connected between output ends of the rectifier circuit 2. A series circuit of the diode D31 and the capacitor C31, functioning as a smoothing capacitor, is connected in parallel with the switching device Q31. The switching device Q31 is formed of a MOSFET, and a step-up chopper controlling circuit 31 is adapted to turn the switching device Q31 on and off.

When the switching device Q31 is turned on and off, the step-up chopper circuit 3 generates a prescribed DC voltage Vdc1 (e.g., 400V) across the capacitor C31 by stepping up (increasing) the DC voltage V2 (an input voltage) inputted from the rectifier circuit 2, and supplies the voltage Vdc1 to the latter step-down chopper circuit 4. The step-up chopper circuit 3 also functions as a power correction circuit, and the switching device Q31 is turned on and off, thereby improving an input current distortion.

The step-down chopper circuit 4 is formed of a primary winding N21 (a second primary winding) of a transformer T41, a switching device Q41 (a second switching device), a diode D41, and a capacitor C41. A series circuit of the capacitor C41 functioning as a smoothing capacitor, the primary winding N21 functioning as a choke coil, and the switching device Q41 is connected in parallel with the capacitor C31. The diode D41 for current regeneration is connected in parallel with a series circuit of the capacitor C41 and the primary winding N21. The switching device Q41 is formed of a MOSFET, and a step-down chopper controlling circuit 41 is adapted to turn the switching device Q41 on and off. The light source 7 is also connected in parallel with the capacitor C41.

The step-down chopper circuit 4 is adapted, in response to the turning on and off of the switching device Q41, to step down (decrease) the DC voltage Vdc1 inputted from the step-up chopper circuit 3 and to apply a DC voltage V4 (a step-down voltage) across the light source 7. Thus, by supplying a prescribed DC current to the light source 7, light-emitting diodes (LEDs) constituting the light source 7 are lit. In the embodiment, the light source 7 is constituted by the light-emitting diodes, but the light source of the present invention may be formed of a single light-emitting diode.

The voltage detection circuit 5 is adapted to detect an output voltage (the DC voltage Vdc1) of the step-up chopper circuit 3 to output a detection signal (a detection result) indicating whether or not the detected voltage Vdc1 is equal to or larger than a threshold voltage Vth1. For example, the voltage detection circuit 5 is formed of a comparator 51, resistors R51 and R52, and a reference voltage source E51, and is adapted to detect the DC voltage Vdc1 to decide a start timing of a step-down (buck) operation in the step-down chopper circuit 4. Specifically, a series circuit of the resistors R51 and R52 is connected in parallel with the capacitor C31. A value (a voltage) obtained by dividing the DC voltage Vdc1 through the resistors R51 and R52 is supplied, as a detection value of the DC voltage Vdc1, to an inverted input terminal of the comparator 51. In addition, a reference voltage Vref1 of the reference voltage source E51 is supplied to a non-inverted input terminal of the comparator 51. The reference voltage Vref1 is set to the value divided through the resistors R51 and R52 (a detection value of the DC voltage Vdc1) when the DC voltage Vdc1 is equal to the prescribed threshold voltage Vth1. Therefore, the comparator 51 is adapted to compare the detection value of the DC voltage Vdc1 with the reference voltage Vref1 and to supply the compared result (a detection result) to the step-down chopper controlling circuit 41.

That is, when the DC voltage Vdc1 is less than the threshold voltage Vth1 (a detection value of the DC voltage Vdc1 is less than a value of the reference voltage Vref1), an output level (the detection signal) of the comparator 51 is high. On the other hand, when the DC voltage Vdc1 is equal to or larger than the threshold voltage Vth1 (a detection value of the DC voltage Vdc1 is equal to or larger than a value of the reference voltage Vref1), the output level of the comparator 51 is low. The step-down chopper controlling circuit 41 is adapted: to keep the switching device Q41 turned off when the detection signal indicates that the detected voltage Vdc1 is less than the voltage Vth1; and also to turn the switching device Q41 on and off when the detection signal indicates that the detected voltage Vdc1 is equal to or larger than the threshold voltage Vth1. In other words, the step-down chopper controlling circuit 41 is adapted: to turn the switching device Q41 on and off when the output level of the comparator 51 is the low level; and also to stop the switching device Q41 from turning on and off when the output level of the comparator 51 is the high level.

The threshold voltage Vth1 is set to a sufficiently higher value (voltage) than a forward voltage Vf1 of the light source 7. Therefore, in the embodiment, after the step-up chopper circuit 3 starts a step-up (boost) operation thereof, the step-down chopper circuit 4 starts a step-down operation thereof from a point in time when the DC voltage Vdc1 is stepped up to be sufficiently higher than the forward voltage Vf1 of the light source 7. Thus, after the step-up chopper circuit 3 starts the step-up operation, the step-down chopper circuit 4 starts the step-down operation, and accordingly the step-up chopper circuit 3 can perform the step-up operation normally.

Specifically, it is possible to prevent such a malfunction that on-state of the switching device Q31 of the step-up chopper circuit 3 is held. That is, it is assumed that the step-down chopper circuit 4 starts the step-down operation: before the step-up chopper circuit 3 starts the step-up operation; or when there is little potential difference between the DC voltage Vdc1 and the forward voltage Vf1 of the light source 7 (Vdc1≈Vf1) and the DC voltage Vdc1 is not stepped up to the prescribed voltage value. In this case, a slope of a choke current flowing through the primary winding N21 of the step-down chopper circuit 4 ((Vdc1−Vf1)/L) is zero or small, where "L" represents an inductance of the primary winding N21. In the case where the step-down chopper controlling circuit 41 performs the turning from ON to OFF of the switching device Q41 at a timing when the choke current flowing through the primary winding N21 exceeds a threshold, a rise of the choke current is delayed and the switching device Q41 has a long on-time. Thus, if the switching device Q41 has a long on-time, power consumption in the light source 7 becomes large, and accordingly the step-up chopper circuit 3 cannot step-up the DC voltage Vdc1 up to the prescribed voltage value. The DC voltage Vdc1 is kept to be equal to the forward voltage Vf1 and the switching device Q41 unacceptably remains in on-state. In the embodiment, the threshold voltage Vth1 is set to a (preferably sufficiently) higher voltage than the forward voltage Vf1 of the light source 7, thereby preventing the switching device Q41 from holding on-state.

The inrush current preventing circuit 6 is adapted: to supply, to a control terminal of a thyristor Q61 through a switch Q62, a voltage Vn12 induced across a secondary winding N12 magnetically coupled to the primary winding N11; and also to constantly supply, to the control terminal of the thyristor Q61, a voltage Vn22 induced across a secondary winding N22 magnetically coupled to the primary winding N21.

The switch Q62 is adapted to be turned on and off in response to the aforementioned detection signal. That is, the switch Q62 is adapted: to be turned on when the detection signal indicates that the detected voltage Vdc1 is less than the threshold voltage Vth1; and also to be turned off when the detection signal indicates that the detected voltage Vdc1 is equal to or larger than the threshold voltage Vth1. Specifically, the inrush current preventing circuit 6 is formed of the thyristor Q61, a thermistor PTH61, resistors R61 and R62, a capacitor C61, diodes D61 and D62, the switch Q62, the secondary winding N12 of the transformer T31, and the secondary winding N22 of the transformer T41. The inrush current preventing circuit 6 in the embodiment is adapted: to prevent an inrush current from flowing to charge the capacitor C31 just after the AC power supply E1 starts supplying the AC voltage Vac1 to the LED lighting device; and to prevent excess power from being supplied to the light source 7 when the switching device Q41 is short-circuited.

The thermistor PTH61 (the current-limiting element) is an element having a property that has a higher resistance value as a temperature (an ambient temperature) more increases (e.g., a posistor (registered trademark) manufactured by Murata Mfg. Co. Ltd.). The thermistor PTH61 is inserted into a negative side power supply path (an input current path) of a pair of power supply paths connecting the rectifier circuit 2 and the step-up chopper circuit 3. As another example, the thermistor PTH61 may be inserted into a positive side power supply path.

The thyristor Q61 (a third switching device) is connected in parallel with the thermistor PTH61. Specifically, an anode of the thyristor Q61 is connected to a negative terminal of the capacitor C31, a cathode thereof is connected to a negative output terminal side of the rectifier circuit 2, and a gate thereof is connected to an output terminal of an integration circuit formed of the resistors R61 and R62 and the capacitor C61. The voltages Vn12 and Vn22 respectively induced in the secondary windings N12 and N22 are supplied, as drive power voltages, to the thyristor Q61, and thereby the thyristor Q61 is activated.

The integration circuit is formed of a series circuit of the resistor R61 and the capacitor C61, and the resistor R62 connected in parallel with the capacitor C61. When receiving the voltages Vn12 and Vn22 induced across the secondary windings N12 and N22, the integration circuit is adapted to smooth the induced voltages Vn12 and Vn22 to supply the smoothed voltages to the thyristor Q61.

A first end of the secondary winding N22 (the second secondary winding) is connected to the negative output terminal side of the rectifier circuit 2, while a second end thereof is connected to a first end of the resistor R61 (an input terminal of the integration circuit) through the diode D61 for backflow prevention. The secondary winding N22 is magnetically coupled to the primary winding N21, and generates an induced voltage Vn22 when the switching device Q41 is turned on and off. Specifically, when the switching device Q41 is turned on, a voltage Vn21 generated across the primary winding N21 has a value (Vdc1-Vf1) obtained by subtracting the forward voltage Vf1 of the light source 7 from the DC voltage Vdc1, where a first end of the primary winding N21 is connected to the negative terminal of the capacitor C41, and a second end of the primary winding N21 is connected to a high potential side of the switching device Q41, and a reference potential is set to a potential on the second end side of the primary winding N21. When the switching device Q41 is turned off, back electromotive force is generated across the primary winding N21, and the voltage Vn21 across the primary winding N21 is almost equal to the forward voltage Vf1, where a reference potential is set to a potential on the first end side of the primary winding N21.

On the other hand, in the case where a turn ratio of the primary winding N21 and the secondary winding N22 is n21:n22, the voltage Vn22 induced across the secondary winding N22 is given by Vn21×n22/n21. The diode D61 is inserted between the second end of the secondary winding N22 and the resistor R61. Therefore, only the voltage Vn22, induced when the switching device Q41 is turned off, is supplied to the integration circuit. The integration circuit is adapted to smooth the induced voltage Vn22 to supply the smoothed voltage to the gate of the thyristor Q61.

A first end of the secondary winding N12 (the first secondary winding) is connected to the negative output terminal side of the rectifier circuit 2 through the switch Q62 (the drive power switch), while a second end thereof is connected to the first end of the resistor R61 through the diode D62 for backflow prevention. The secondary winding N12 is magnetically coupled to the primary winding N11, and generates the induced voltage Vn12 when the switching device Q31 is turned on and off. When the switch Q62 is turned on, the induced voltage Vn12 across the secondary winding N12 is supplied to the integration circuit, and is smoothed through the integration circuit to be supplied to the gate of the thyristor Q61.

The switch Q62 has a control terminal connected to the output terminal of the comparator 51, and is configured to be turned on when the output level of the comparator 51 is a high level, and to be turned off when the output level of the comparator 51 is a low level. Therefore, when the DC voltage Vdc1 is less than the threshold voltage Vth1 and the output level of the comparator 51 is the high level, the switch Q62 is turned on and the voltage Vn12 induced across the secondary winding N12 is supplied to the integration circuit. On the other hand, when the DC voltage Vdc1 is equal to or larger than the threshold voltage Vth1 and the output level of the comparator 51 is the low level, the switch Q62 is turned off, and accordingly the output from the secondary winding N12 to the integration circuit is shut off.

Thus, the switch Q62 is turned on and off, thereby switching drive power for the thyristor Q61. When the DC voltage Vdc1 is less than the threshold voltage Vth1, the switch Q62 is turned on and the step-down operation is not started yet in the step-down chopper circuit 4. In this case, only the induced voltage Vn12 across the secondary winding N12 is employed as drive power of the thyristor Q61. On the other hand, when the DC voltage Vdc1 is equal to or larger than the threshold voltage Vth1, the switch Q62 is turned off and the step-down operation is started in the step-down chopper circuit 4. In this case, only the induced voltage Vn22 across the secondary winding N22 is employed as the drive power of the thyristor Q62.

Figure 2:
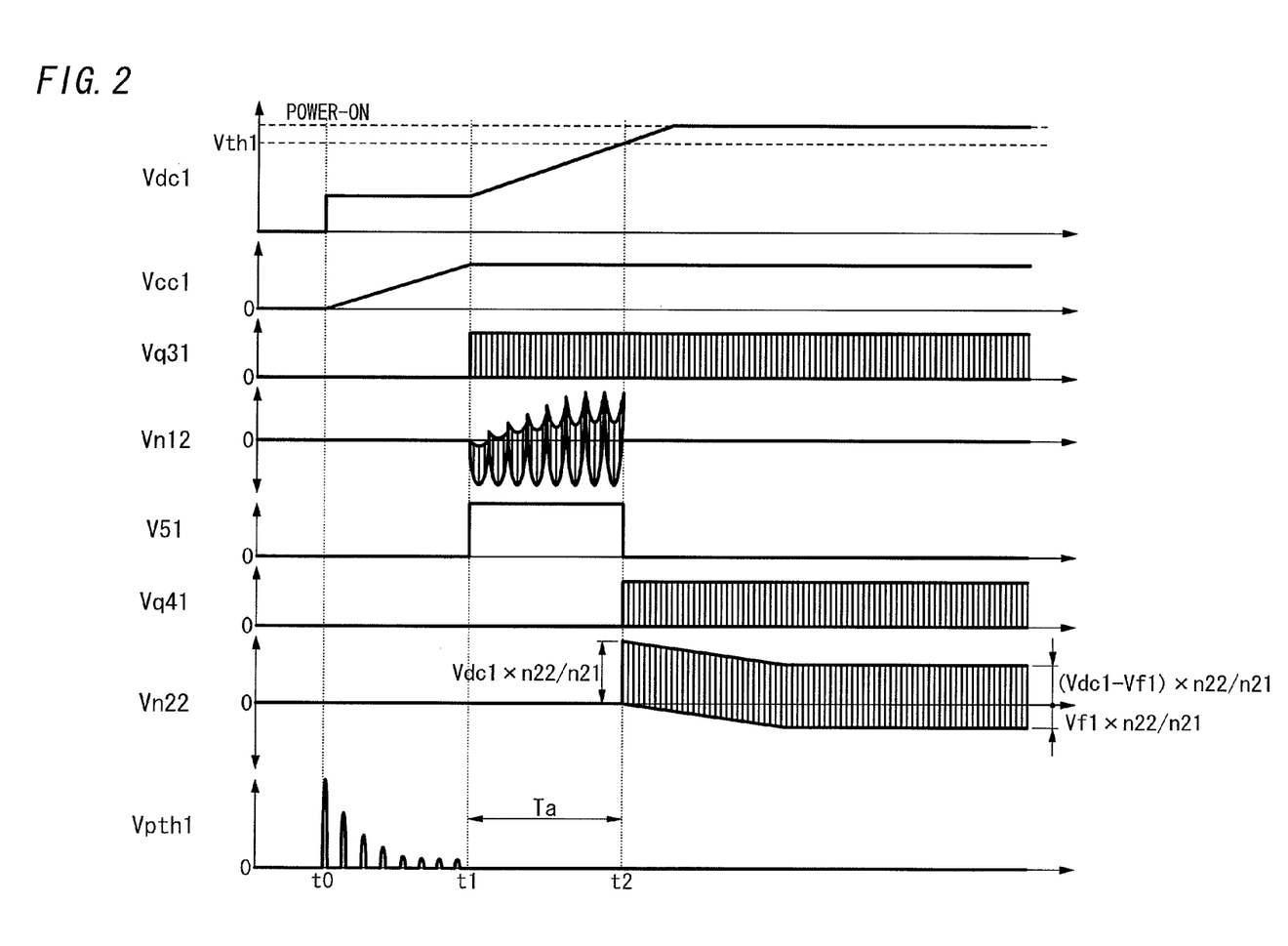
FIG. 2 is a timing chart showing an operation of the LED lighting device.

A start operation of the LED lighting device in the embodiment is explained with reference to FIG. 2. In FIG. 2, "Vdc1" shows a wave form of the DC voltage Vdc1 output from the step-up chopper circuit 3; "Vcc1" shows a wave form of a control power supply voltage Vcc1 output from a control power supply (not shown) for driving the step-up chopper controlling circuit 31 and the step-down chopper controlling circuit 41; "Vq31" shows a wave form of a gate voltage of the switching device Q31; "Vn12" shows a wave form of the induced voltage Vn12 across the secondary winding N12 that is employed as the drive power supply of the thyristor Q61, where the reference potential is set to the potential on the second end side of the secondary winding N12; "V51" show an output wave form of the comparator 51; "Vq41" shows a wave form of a gate voltage of the switching device Q41; "Vn22" shows a wave form of the induced voltage Vn22 across the secondary winding N22, where the reference potential is the potential on the second end side of the secondary winding N22; and "Vpth1" shows a wave form of a voltage Vpth1 across the thermistor PTH61.

At a time t0, a switch (not shown) is turned on (power-on), power is supplied to the LED lighting device from the AC power supply E1, and the control power supply voltage Vcc1 starts increasing. At this moment, the voltage Vcc1 is lower than operable voltages of the step-up chopper controlling circuit 31 and the step-down chopper controlling circuit 41, and the switching devices Q31 and Q41 are in off-state, and accordingly the voltages Vn21 and Vn22 are not induced across the secondary windings N12 and N22. Therefore, the thyristor Q61 remains in off-state. In this case, an input current to the step-up chopper circuit 3 flows through the thermistor PTH 61, and the voltage Vpth1 generates across the thermistor PTH 61. In short, since the thyristor Q61 is turned off from a point in time when the power is supplied, the input current is supplied to the step-up chopper circuit 3 through the thermistor PTH 61. Therefore, the resistance value of the thermistor PTH 61 increases, thereby suppressing an inrush current from flowing to charge the capacitor C31.

At a time t1, the control power supply voltage Vcc1 reaches the operable voltage of the step-up chopper controlling circuit 31, and then the circuit 31 starts turning the switching device 31 on and off and thereby the step-up chopper circuit 3 starts the step-up operation. Accordingly, the DC voltage Vdc1 increases, and the input current distortion is improved.

At this time, the switching device Q31 is turned on and off, so that a voltage Vn12 is induced across the secondary winding N12. In addition, since the DC voltage Vdc1 is still less than the threshold voltage Vth1, the output level of the comparator 51 is a high level. Therefore, the switch Q62 is turned on and the induced voltage Vn12 is supplied to the integration circuit. That is, in a period of time Ta (t1 to t2) before the DC voltage Vdc1 reaches the threshold voltage Vth1, only the induced voltage Vn12 is employed as the drive power supply that turns the thyristor Q61 on. When the thyristor Q61 is turned on, the electric current flowing through the thermistor PTH61 decreases and power consumption in the thermistor PTH61 decreases as well. The reduction of an input voltage to the step-up chopper circuit 3 by the thermistor PTH61 is suppressed, and accordingly the circuit 3 can normally perform the step-up operation and the DC voltage Vdc1 can be stepped up to the prescribed voltage value (e.g., 400V).

At a time t2, the DC voltage Vdc1 reaches the threshold voltage Vth1, and then the output level of the comparator 51 is turned to be low. As a result, the step-down chopper controlling circuit 41 starts turning the switching device Q41 on and off, and thereby the step-down chopper circuit 4 starts the step-down operation to light on the light source 7. In addition, at a time t2, the switch Q62 in on-state is turned off to shut off the power supply from the secondary winding N12 to the thyristor Q61. On the other hand, since the step-down chopper controlling circuit 41 starts turning the switching device Q41 on and off, the on-state of the thyristor Q61 is kept by a voltage Vn22 induced across the secondary winding N22.

Here it is assumed that the switch Q62 is not included in the inrush current preventing circuit 6. In this case, even when the drain-source of the switching device Q41 are short-circuited and no voltage is induced across the secondary winding N22, the switching device Q31 is still turned on and off. Accordingly, the thyristor Q61 employs, as the drive power supply thereof, the voltage induced across the secondary winding N12 to turn on. Therefore, even if the drain-source of the switching device Q41 are short-circuited, an electric current hardly flows through the thermistor PTH61. As a result, excess power may be supplied to the light source 7.

Therefore, in the embodiment, when the light source 7 is lit, only the induced voltage Vn22 across the secondary winding N22 is employed as a drive power supply of the thyristor Q61. Therefore, when the drain-source of the switching device Q41 are short-circuited, the thyristor Q61 is turned off, because the voltage Vn22 is not induced across the secondary winding N22. Thus, the thyristor Q61 is turned off, and then the input current is supplied to the step-up chopper circuit 3 through the thermistor PTH61, and accordingly the resistance value of the thermistor PTH61 increases. As a result, the input voltage to the step-up chopper circuit 3 decreases to fall below a rated input value. When the input voltage to the step-up chopper circuit 3 decreases, the step-up chopper circuit 3 cannot normally perform the step-up operation, so that the DC voltage Vdc1 cannot be stepped up to a voltage equal to or larger than the forward voltage Vf1 of the light source 7. As a result, the light source 7 is extinguished or slightly lit, thereby preventing the excess power from being supplied to the light source 7 and suppressing temperature rise of members around a lighting fixture with the LED lighting device.

Thus, in the embodiment, the drive power supply for the thyristor Q61 is changed before and after the step-down chopper circuit 4 starts the step-down operation.

In the period of time Ta when only the step-up chopper circuit 3 of the circuits 3 and 4 is activated, only the induced voltage Vn12 across the secondary winding N12 magnetically coupled to the primary winding N11 of the step-up chopper circuit 3 is employed as the drive power supply for the thyristor Q61. Accordingly, if the step-up chopper circuit 3 starts the step-up operation, and the thyristor Q61 is turned on. It is therefore possible to suppress a large increase in power consumption of the thermistor PTH61. In addition, the reduction of an input voltage to the step-up chopper circuit 3 by the thermistor PTH61 is suppressed, and it is accordingly possible to prevent the input voltage to the step-up chopper circuit 3 from falling below the rated input value, and to surely increase the DC voltage Vdc1 up to the prescribed value.

When the step-down chopper circuit 4 starts the step-down operation, only the induced voltage Vn22 across the secondary winding N22 magnetically coupled to the primary winding N21 of the circuit 4 is employed as the drive power supply for the thyristor Q61. Therefore, when the drain-source of the switching device Q41 of the step-down chopper circuit 4 are short-circuited, the thyristor Q61 is turned off. If the thyristor Q61 is turned off, the input voltage to the step-up chopper circuit 3 decreases to fall below the rated input value, and the step-up chopper circuit 3 cannot perform a normal step-up operation, thereby decreasing the DC voltage Vdc1. It is therefore possible to suppress the excess power supply to the light source 7 and temperature rise of members around the lighting fixture with the LED lighting device.

Embodiment 2

Figure 3:
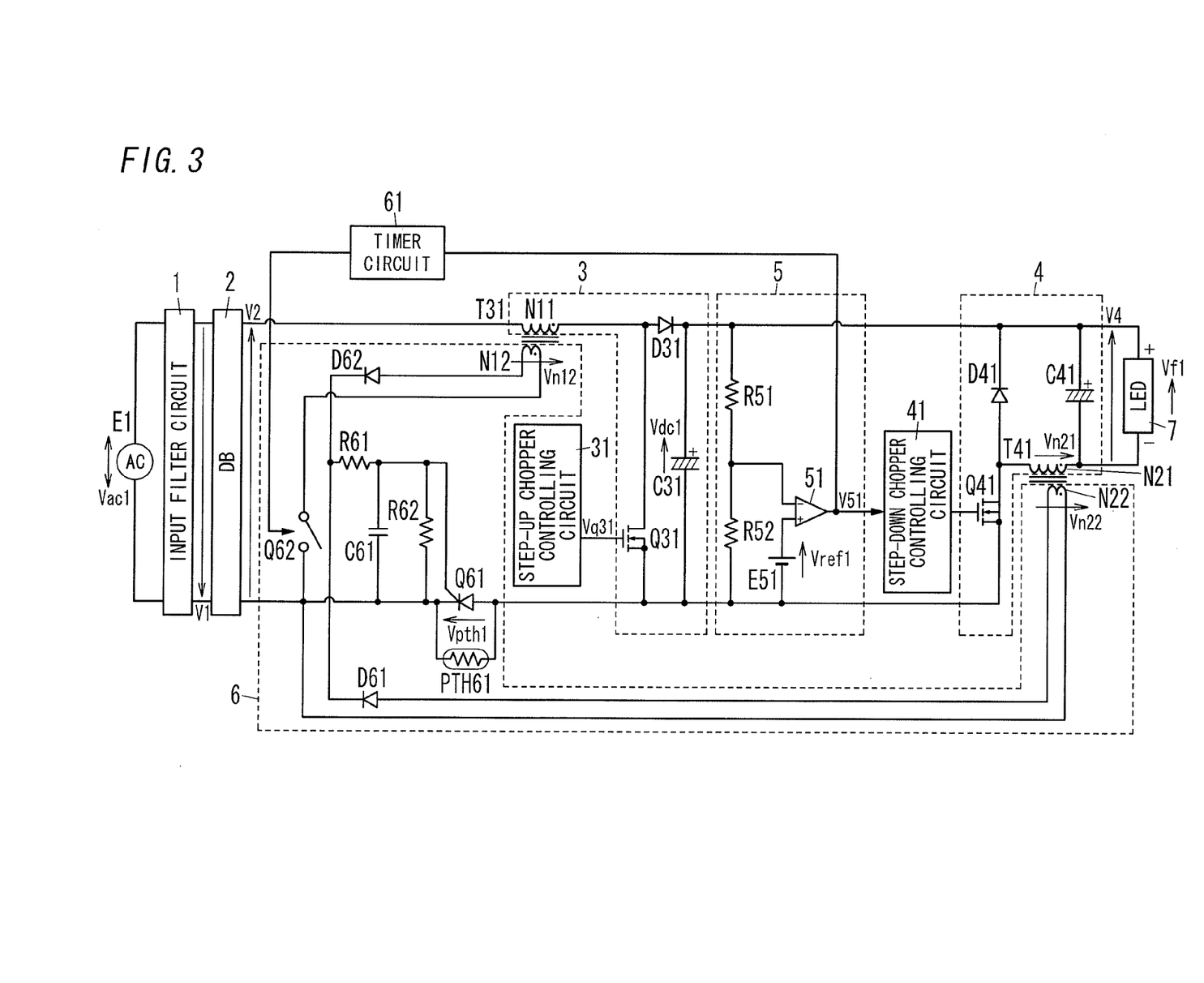
FIG. 3 is a circuit diagram of an LED lighting device, in accordance with a second embodiment of the present invention.

FIG. 3 shows a circuit diagram of an LED lighting device in accordance with a second embodiment of the present invention. The present embodiment differs from the first embodiment in that a timer circuit 61 is further inserted between a comparator 51 and a switching device Q62. Therefore, like kind elements are assigned the same reference numerals as depicted in the first embodiment, and accordingly are not described in detail herein.

The timer circuit 61 is inserted between an output terminal of the comparator 51 and a control terminal of the switching device Q62. The timer circuit 61 is adapted to delay a falling timing signal by a prescribed period of time Tb to transmit the delayed falling timing signal to the switching device Q62, where the falling timing signal is a timing signal that an output level of the comparator 51 is turned to a low level from a high level. That is, the switch Q62 in on-state is turned off after the period of time Tb elapses from a point in time when the DC voltage Vdc1 is equal to or larger than the threshold voltage Vth1 and a step-down chopper circuit 4 starts a step-down operation thereof.

Figure 4:
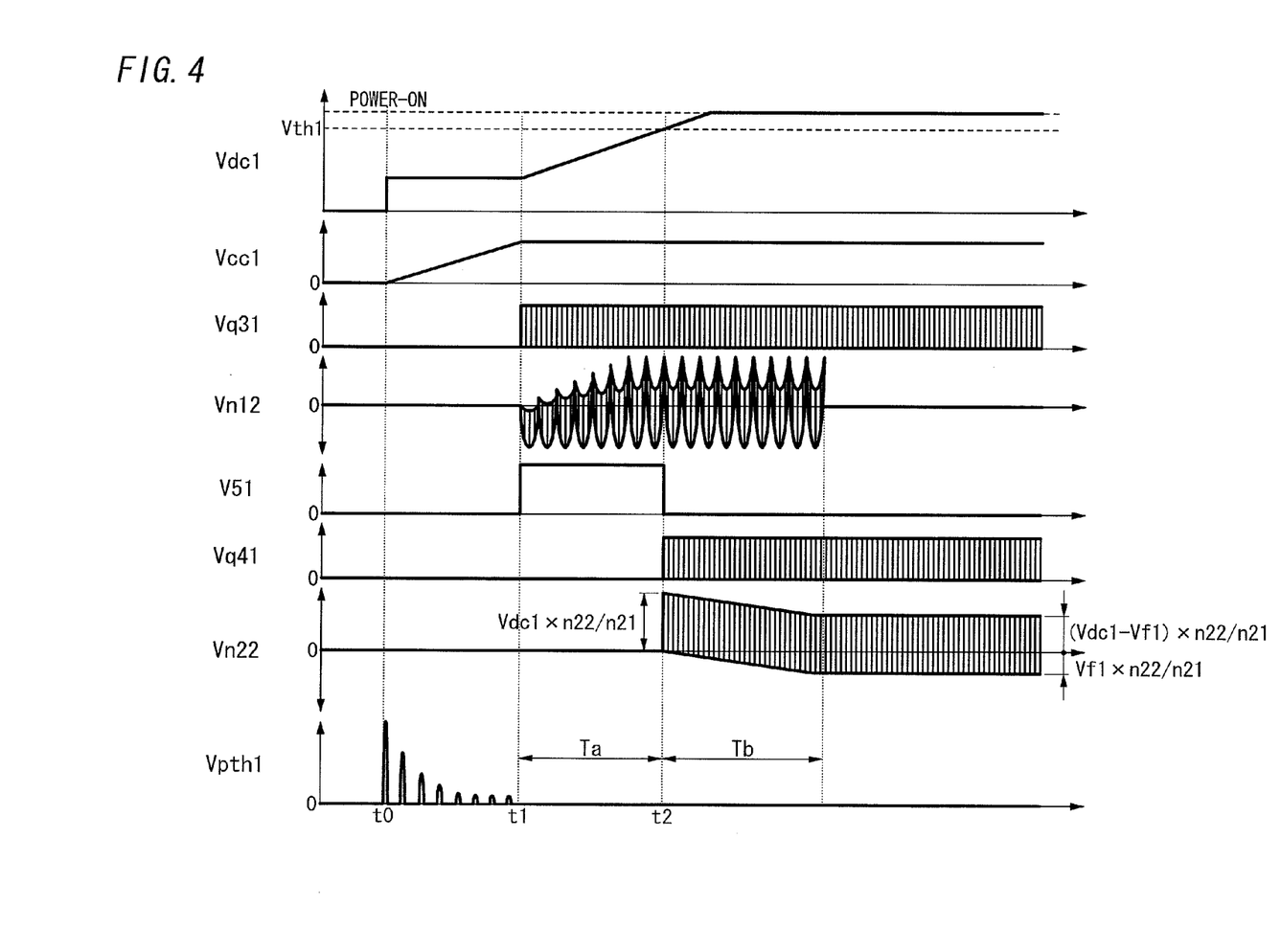
FIG. 4 is a timing chart showing an operation of the LED lighting device in the second embodiment.

A start operation of the LED lighting device in the embodiment is explained with reference to FIG. 4. In FIG. 4, "Vdc1" shows a wave form of a DC voltage Vdc1 output from a step-up chopper circuit 3; "Vcc1" shows a wave form of a control power supply voltage Vcc1 output from a control power supply (not shown) for a step-up chopper controlling circuit 31 and a step-down chopper controlling circuit 41; "Vq31" shows a wave form of a gate voltage of a switching device Q31; "Vn12" shows a wave form of an induced voltage Vn12 across a secondary winding N12 that is employed as a drive power supply of a thyristor Q61, where the reference potential is set to the potential on a second end side of the secondary winding N12; "V51" show an output wave form of the comparator 51; "Vq41" shows a wave form of a gate voltage of a switching device Q41; "Vn22" shows a wave form of an induced voltage Vn22 across a secondary winding N22, where the reference potential is the potential on a second end side of the secondary winding N22; and "Vpth1" shows a wave form of a voltage Vpth1 across a thermistor PTH61.

An operation before a time t2 is the same as that of the second embodiment, and therefore is not described in detail herein.

At the time t2, the DC voltage Vdc1 reaches a threshold voltage Vth1 and the output level of the comparator 51 is turned to a low level. Accordingly, the step-down chopper controlling circuit 41 starts turning the switching device Q41 on and off, and thereby the step-down chopper circuit 4 starts the step-down operation to power a light source 7. In addition, at the time t2, a signal to be transmitted from the comparator 51 to the switching device Q62 is delayed through the timer circuit 61. Therefore, the switching device Q62 is turned off after it is turned on for the period of time Tb from a point in time (t2) when the DC voltage Vdc1 reaches the threshold voltage Vth1. That is, in the period of time Tb, both the induced voltage Vn12 across the secondary winding N12 and the induced voltage Vn22 across the secondary winding N22 are employed as a drive power supply for the thyristor Q61.

For example, if only the induced voltage Vn22 is employed as the drive power supply for the thyristor Q61 just after the step-down chopper circuit starts the step-down operation, there is a concern that an off-time of the thyristor Q61 occurs, because a rise of the voltage supplied to the thyristor Q61 is delayed through the integration circuit. In the embodiment, the induced voltage Vn12 across the secondary winding N12 is kept as the drive power supply for the thyristor Q61 for the period of time Tb from the point in time when the step-down chopper circuit 4 starts the step-down operation. It is possible to prevent the thyristor Q61 from turning off when the drive power supply for the thyristor Q61 is changed, because the voltage supplied to the thyristor Q61 from the secondary winding N22 can be increased during the period of time Tb.

After the period of time Tb elapses, only the induced voltage Vn22 across the secondary winding N22 is employed as the drive power supply for the thyristor Q61. It is therefore possible to prevent excess power from being supplied to the light source 7 when the switching device Q41 is short-circuited and to prevent a temperature rise of members of a lighting fixture with the LED lighting device.

In the period of time Tb, it is not possible to prevent excess power from being supplied to the light source 7 when the drain-source of the switching device Q41 are short-circuited, because the induced voltage Vn12 across the secondary winding N12 is employed as the drive power supply for the thyristor Q61. However, by setting the period of time Tb in a range of about few seconds, it is possible to suppress a temperature rise of members of the lighting fixture caused by heat generation of the light source 7 even when the switching device Q41 is short-circuited in the period of time Tb.

The invention claimed is:

1. An LED lighting device comprising:
   a step-up chopper circuit that comprises a first switching device and a first primary winding and is configured to step up an input voltage to a prescribed DC voltage in response to a turning on and off of the first switching device;
   a step-up chopper controlling circuit configured to control the turning on and off of the first switching device;
   a voltage detection circuit configured to detect an output voltage of the step-up chopper circuit;
   a step-down chopper circuit that comprises a second switching device and a second primary winding and is configured, in response to a turning on and off of the second switching device, to step down the output voltage of the step-up chopper circuit and to apply the stepped down voltage across a light source comprised of one or more light emitting devices;
   a step-down chopper controlling circuit configured: to keep an OFF state of the second switching device when a detection result of the voltage detection circuit is less than a threshold; and to control the turning on and off of the second switching device when the detection result of the voltage detection circuit is equal to or larger than the threshold; and
   an inrush current preventing circuit that comprises a third switching device and a current-limiting element connected in parallel with the third switching device and is provided on an input current path of the step-up chopper circuit, said third switching device employing, as a drive power supply thereof, voltages induced across a first secondary winding magnetically coupled to the first primary winding and across a second secondary winding magnetically coupled to the second primary winding;
   wherein the inrush current preventing circuit further comprises a drive power switch configured: to employ only the voltage induced across the first secondary winding as the drive power supply of the third switching device when the detection result of the voltage detection circuit is less than the threshold; and also to employ only the voltage induced across the second secondary winding as the drive power supply of the third switching device when at least the detection result of the voltage detection circuit is equal to or larger than the threshold.

2. An LED lighting device of claim 1, wherein the drive power switch is configured:
   to employ the voltages induced across the first secondary winding and across the second secondary winding as drive power supply of the third switching device for a prescribed period of time from a point in time when the detection result of the voltage detection circuit is equal to or larger than the threshold; and
   to employ only the voltage induced across the second secondary winding as drive power supply of the third switching device after the prescribed period of time elapses.

* * * * *